(12) United States Patent
Young

(10) Patent No.: US 12,470,169 B2
(45) Date of Patent: Nov. 11, 2025

(54) SOLAR PANEL AND RAIL WITH EDGE CONNECTORS

(71) Applicant: James Young, Katy, TX (US)

(72) Inventor: James Young, Katy, TX (US)

(*) Notice: Subject to any disclaimer, the term of this patent is extended or adjusted under 35 U.S.C. 154(b) by 115 days.

(21) Appl. No.: 17/835,144

(22) Filed: Jun. 8, 2022

(65) Prior Publication Data
US 2022/0302871 A1 Sep. 22, 2022

Related U.S. Application Data

(63) Continuation of application No. PCT/IB2020/000330, filed on Feb. 7, 2020.

(51) Int. Cl.
*H02S 30/10* (2014.01)
*F24S 25/63* (2018.01)
*H02S 20/32* (2014.01)
*F24S 25/60* (2018.01)

(52) U.S. Cl.
CPC .............. *H02S 30/10* (2014.12); *F24S 25/63* (2018.05); *H02S 20/32* (2014.12); *F24S 2025/6007* (2018.05)

(58) Field of Classification Search
CPC .......................... F24S 2025/6007; F24S 25/63
See application file for complete search history.

(56) References Cited

U.S. PATENT DOCUMENTS

| 6,105,317 A | * | 8/2000 | Tomiuchi | F24S 40/44 52/173.3 |
| 2010/0154784 A1 | * | 6/2010 | King | F24S 80/40 126/623 |
| 2015/0122333 A1 | * | 5/2015 | Kitano | H02S 20/10 136/259 |

FOREIGN PATENT DOCUMENTS

| DE | 19934073 B4 | * | 6/2005 | F24S 25/20 |
| DE | 10 2008 055937 | | 5/2014 | |
| SE | 1351354 A1 | * | 6/2015 | |

OTHER PUBLICATIONS

Machine translation of SE1351354A1 (Year: 2015).*

* cited by examiner

*Primary Examiner* — Ryan S Cannon
(74) *Attorney, Agent, or Firm* — Millen, White, Zelano & Branigan, P.C.; Christopher W. Brody

(57) ABSTRACT

Solar panels, which at least at edges of two opposite sides, have frames, for use in fixed tilt solar system as well as use in tracking solar system, are provided with coupling parts together with rails and have coupling parts cooperating with each other, substantially in the form of tongue and groove. The coupling parts have integrated mechanical locking elements, which prevent drifting or separating apart of a coupled solar panel and rail in a direction perpendicular to the solar panel surface and parallel to the solar panel surface. The coupled tongue and groove are balanced by a set of forces and integrated to support each other, and to support solar panel with combined mechanical strength, which provide opportunities to reduce materials usage, dimensions, packaging materials, shipping costs, and installation time, as well as limiting installer error.

19 Claims, 17 Drawing Sheets

SOLAR PANEL AND RAIL WITH EDGE CONNECTORS

BACKGROUND OF THE INVENTION

1. Field of the Invention

This invention relates to solar panels, made of solar cells on glass and frames, and the rails for solar panel to be fixed on.

2. Related Technology

The invention is firstly intended for so-called c-silicon solar panels, but generally it can be applied for other kinds of solar panels, such as thin-film solar panels, double-side solar panels, compound solar panels or other solar panels which can be compared to c-silicon solar panels in the sense of solar cells attached to or grown onto glass, covered by another glass or else.

It is known such solar panels can be fixed on to rails of racking structure and/or roof in various ways.

According to the first possibility, the solar panels are attached to rails by clamps on top of the frame or on bottom of the frame. The clamps, mid clamps, end clamps or simply clamp, are made of metal and clamp down by using bolts and nuts through the holes or sluts on the rail. These prior art techniques require many parts and takes tedious time for installer to handle and fixing.

According to a second possibility, the solar panels are attached to the rail directly through bolts and nuts through prefabricated holes on the under side of the frame and through the holes or sluts on the rail. This manner has an advantage that it uses less part to clamp but requires matching prefabricated holes and access the bolts which is often difficult or impossible, such as installing on top of a roof, which causing on-site drilling that delaying processes.

According to a third possibility, the solar panels are attached to rails by clamps inserted from side of the frame. This method has the advantage of fast insertion and fixing but requires prefabricated sluts on the side of frame. The frame thus has a bigger size and uses more materials. Up to present time, only one company, First Solar, in the solar industry is using this method, with clamps produced by a partner company, ModuRack, Inc., where the inventor works for.

According to a fourth possibility, the solar panels are attached to the rail by clamping on the inner edge of the frames (patent pending Ser. No. 15/081,817 by the inventor). This method 35 has the advantage of fast clamping and integrated grounding effect. The frame remains the same size without the benefit of material and height reduction.

Disadvantage with frame clamping of the above-mentioned types, above all, require the frame by itself strong enough to support the solar panel and meet all the industrial mechanical and safety codes and requirements. As a result, the current solar panel frame requires large amount of materials, mostly aluminum, usage. The frame height also limits the packaging density that caused high packaging and shipping cost. The clamping processes also limited the installation speed and caused high labor cost and particular caused long project execution period.

Solar panels have been using the similar frame designs for decades without significant 45 changes, since the beginning of the meaningful industrial ramp up scale. In order to remedy these disadvantages, techniques have been developed trying to improve installation speed, such as First Solar S6 frames with so-called 'speed-slot'.

On the other hand, edge connectors are known in other uses, such as flooring. In flooring applications, the so-called tongue and groove are applied on opposite sides of so the floor panel and connect in sequence. These techniques are not able to applied to solar panel due to the fact that the solar panels need to be fixed in outdoor environment for sunshine and there is no flat subfloor as support. Free floating is also not allowed for solar panel installations.

BRIEF SUMMARY OF THE INVENTION

The invention aims at an improved solar panel of the aforementioned types, the solar panels of which can be coupled to the rails in an optimum manner and the solar panel can be manufactured in a smooth manner, with reduced material use, reduced frame height and faster installations and whereby preferably one or more of the aforementioned disadvantages are excluded. By integrated together with the rail through coupling tongue and groove elements is understood that the solar panel frame and rail form an fixed part of the solar panel and rail, in such a manner that the frame and rail together provide the mechanical strength.

Furthermore, the invention also aims at a solar panel whereby the subsequent repair and/or exchange of solar panel can be achieved in optimum manner.

To this aim, the invention relates to a solar panel consisting of solar cells and glass which, at least at the edges of the two opposite sides, are provided with frames which provided with coupling parts, cooperating to the coupling parts of rails, substantially in the form of tongue and groove, wherein the coupling parts are provided with integrated mechanical locking elements which prevent the drifting and shaking of coupled solar panel to the related rail edges in perpendicular and parallel to the solar panel surface.

Hereby, these coupling parts are optimized in such a manner that the drifting and shaking are excluded.

The invention also aims at a solar panel which has the advantage that installer errors are reduced during preparation and/or during installation.

In the first important preferred form of embodiment, the solar panel frame and the rail are coupled to form an integrated part that has combined strength from the frame and the rail. In the engaged position of solar panel frame and rail, exert tension force upon each other which provide mechanical strength to the solar panel through the strength of the rail, at most locations, if not all, along the entire coupled length of frame and rail. This is one of the most distinguished differences from the aforementioned clamping methods, which the support only limited to the location of the clamps.

Furthermore, coupling parts are provided with locking mechanism that drifting and shaking are excluded, no free-of-play between solar panel and rail.

This locking mechanism also has an optimum manner that installer errors are excluded and/or reduced.

According to another characteristics of the intention the coupling parts, hereby are formed in one piece with the solar panel frame and the supporting rail of the racking system.

According to a second embodiment, the aforementioned optimization is achieved in that the solar panel frame and the coupling locking parts on the rail have such a shape that snap-in (turning Direction C), slide-in (Direction B) and parallel push-in (Direction E), as in FIGS. 25-27, are achieved. As a result of this that solar panels can be installed in these three manners and subsequent replacement of any single solar panel can be achieved by removing the panel or coupled rail.

Due to the fact that the coupling parts provide for an interlocking of solar panel frame and the rail, as well as due to the fact that the rail parts are manufactured with steel, aluminum or such with strength meeting the code and mechanical requirements, a significant material reduction on the frame can be guaranteed, with also reduced height. A perfect connection always under tension provided by the locking feature exclude the drifting and shaking, even with repeated thermal expansion and wind effect cycles.

The combination of characteristics can be combined or not with the aforementioned characteristics that the locking means exert a tension force upon each other when solar panels and rails joint together.

This invention for solar panel frame and rail, include tongue and grove features. Tongue can have various shapes with matching groves. Tongue can be either on frame side or on rail side, with groove on the other. Some tongue and matching groove pairs allow all snap-in, push-in and slide-in features. Some tongue and matching grove pairs allow one or two of the features only.

According to a third important preferred embodiment, the solar panel frame and the coupling rail are characterized that the upper lip of the groove, which defines the contact level on the upper side of the rail. The locking elements are formed at least a as portion of the groove upper lip inwardly slopes downward, and that this portion is extended beyond the lower lip of the groove.

According to a particular form of embodiment, coupling parts are configured as a rectangular shape and that the coupling parts are provided at all four edges.

According to a preferred form of embodiment, the solar panels are configured as a rectangular shape and that the coupling parts are provided at the opposite longer sides of these solar panels, not on two opposite short edges.

According to a preferred form of embodiment, the solar panel frame that can be provided groove as the coupling part and that the rail provided tongue as the coupling part. The advantage is that the rail can be c-purlin with production simplicity and engineering data are readily available.

According to a particular form of embodiment, the groove on the solar panel frame has opening inward. The advantages are that the solar panels are symmetric, and that the gap between two adjacent solar panels has minimal width.

In the most preferred form of embodiment, the basic material use for the frame and the coupling part shall be made of same material and made into a unitary metal material. More particularly shall be made of extruded aluminum, which is already widely used for solar panel frames.

In the most preferred form of embodiment, the basic material use for the rail and the coupling part shall be made of same material and made into a unitary metal material. More particularly shall be made of roll-formed galvanized steel, which is already widely used for solar racking systems.

The fact that the invention is applied to solar panels and the rails of with consist of the materials described above, offers the advantages that the manufacturing processes, namely extrusion and roll-forming, are extremely efficient and mature manufacturing processes. Also these materials, namely aluminum and steel, are the most basic, widely available and currently in use materials.

Both extrusion and roll-forming produced products have smooth and uniform surfaces that have the advantage the solar panels can slide manually alongside the surfaces of each other in interlocked position.

In the case that for the frame and rail are made of materials based on synthetic materials, for this use, the synthetic can be a mixture of synthetic materials, even composed of recycled materials.

The solar panels preferably are fixed into each other with the coupling rail without use of bolt. In this coupling the solar panels can be replaced when a damaged solar panel should occur. It is, however, clear that a sliding limiting pin or bolt between solar panel and coupling rail are not excluded.

The invention also relate to the manufacturing methods, namely extrusion and roll forming. Both manufacturing methods provide one-pass process to complete the designed profile.

DETAILED DESCRIPTION

Figure 1A:
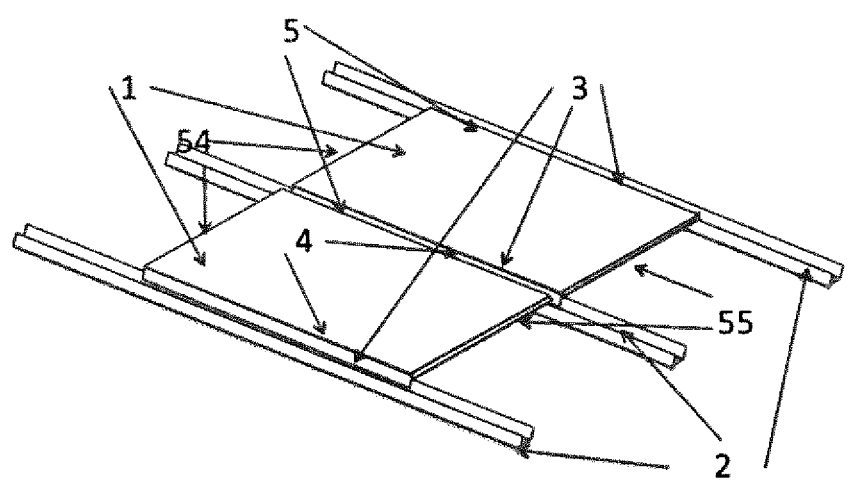
FIG. 1A represents a diagram of solar panels assembled for fixed tiled solar system, with rails and frames coupled according to this invention.
Figure 1B:
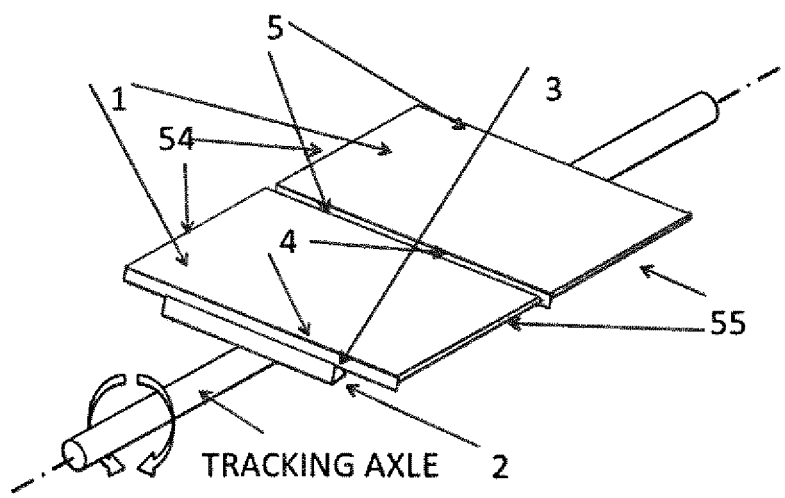
FIG. 1B represents a schematic diagram of solar panels assembled for single axle tracking solar system, with rails and frames coupled according to this invention.

The invention relates to a solar panel and rail system, which is composed of solar panel 1 and coupling rail 2, for example, such as a solar panel and rail as shown in FIG. 1A and FIG. 1B.

These solar panels 1 can be of various shape, for example, rectangular or square, or of any other shape. These rails 2 can be of various shape, for example, c-channel with inward bending edge, or of any other shape.

In the most preferred form of embodiment, the solar panels shall be manufactured in an elongated form, such as shown in FIGS. 1A and 1B, for example, with a length of 1 to 4 meters, and width of 0.5 to 2 meters. The thickness, however, can also vary, but is preferably 1.0 to 6.0 cm, and more particularly 2.5 cm.

In the most preferred form of embodiment, the rails shall be manufactured in an elongated c-channel form, such as shown in FIGS. 1A and 1B, for example, with a length of 0.4 to 12 meters. The height and width, however, can also vary, but is preferably 4.0 to 16.0 cm, and more particularly 10 cm for height, and is preferably 3.0 to 11.0 cm, and more particularly 7 cm for width.

Figure 2:
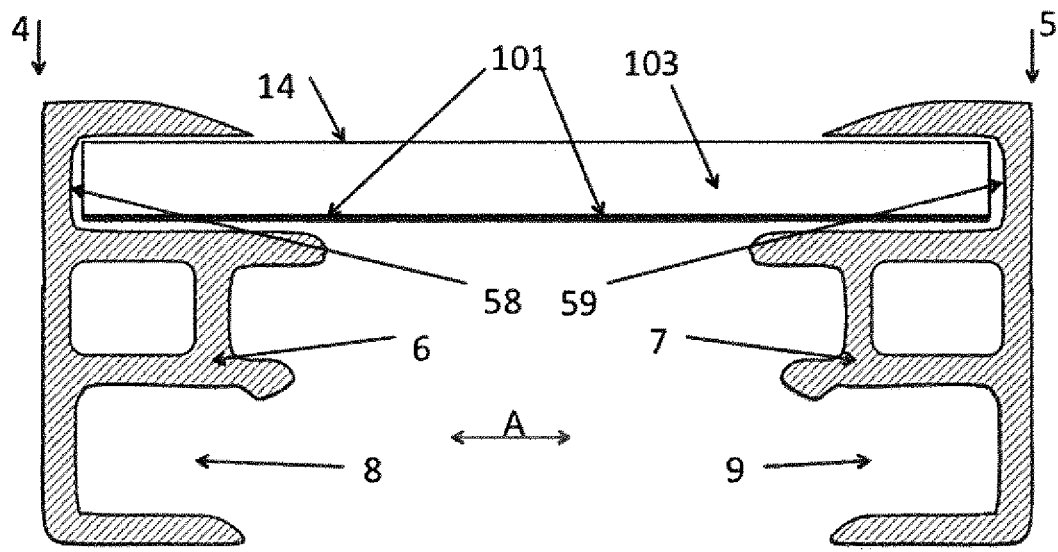
FIG. 2 represents a schematic cross section of a solar panel, single glass, with frame according to this invention, glass inserts into groove.
Figure 3:
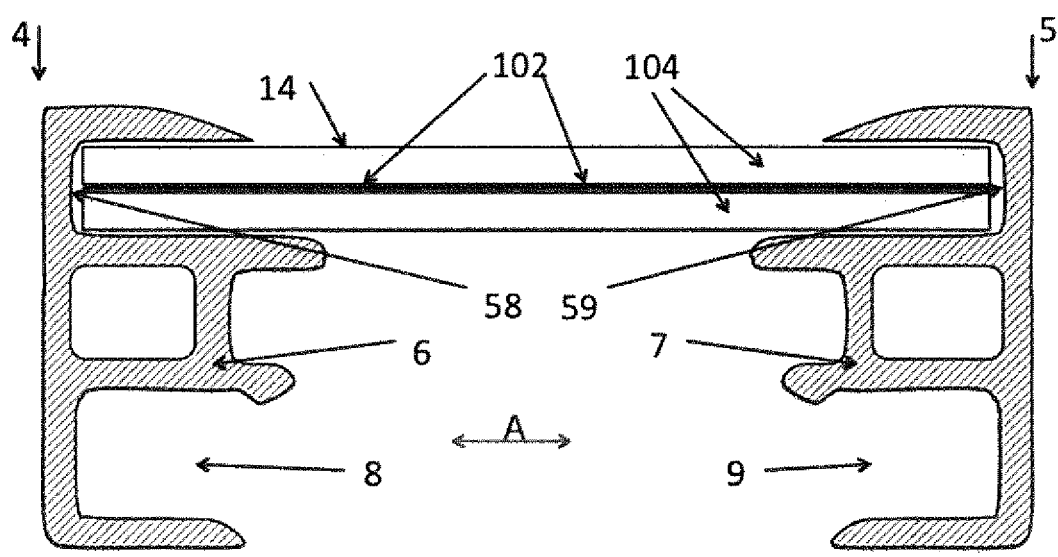
FIG. 3 represents a schematic cross section of a solar panel, double glasses, with frame according to this invention, glasses insert into groove.
Figure 6:
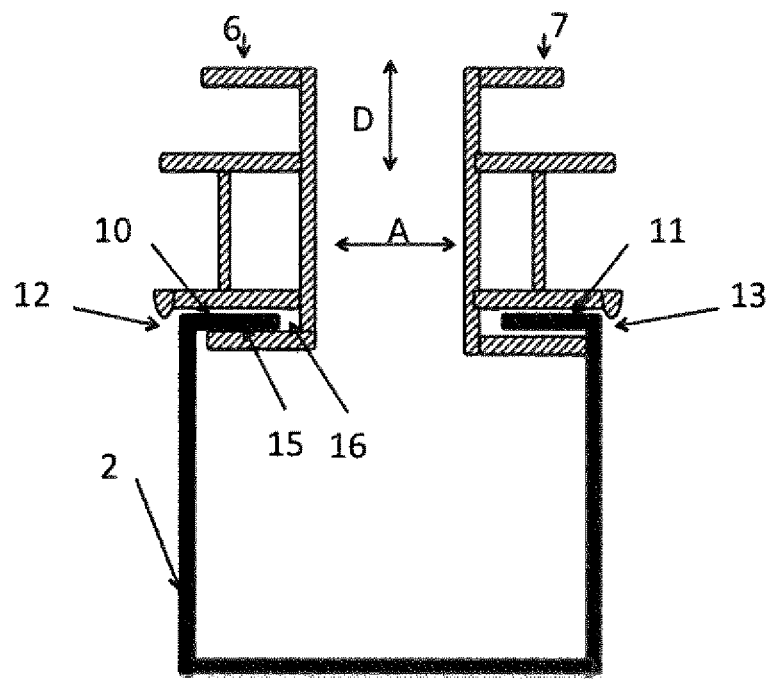
FIG. 6 represents a cross section of solar panel frames coupled with a rail by tongue and groove according to this invention.

Each solar panel 1 is, at least at the edges of two opposite sides 4-5, has frames 6-7, provided with coupling grooves 8-9, as shown in FIG. 2 and FIG. 3, which permit two adjacent identical solar panels 1 to be coupled to rail 2 with coupling tongues 10-11, as shown in FIG. 6. Glass and glasses may insert in grooves 58 and 59 of frame 6 and 7. Whereas, 101 and 102 represent the location of the solar cells, 103 and 104 represent solar panel glasses.

Figure 4:
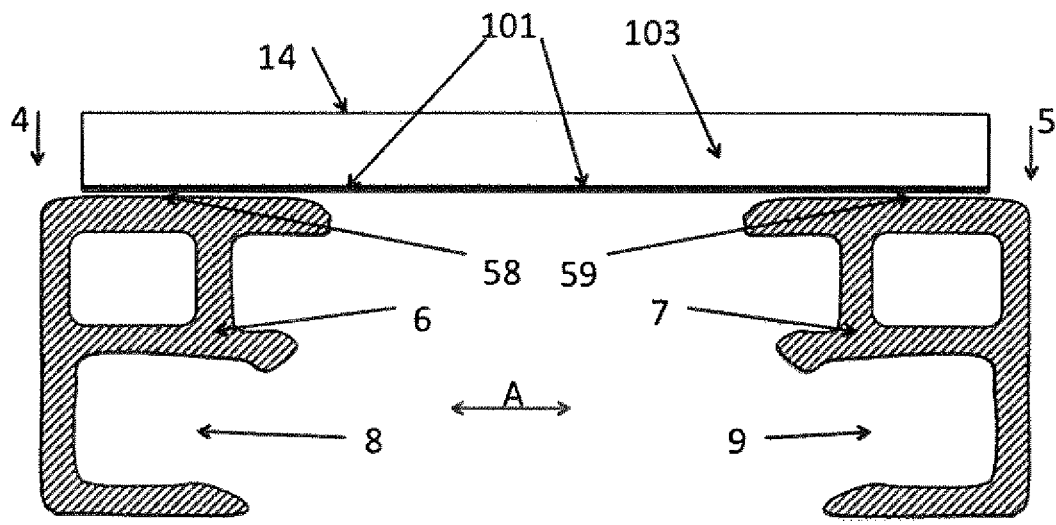
FIG. 4 represents a schematic cross section of a solar panel, single glass, with frame according to this invention, glass glued on frame.
Figure 5:
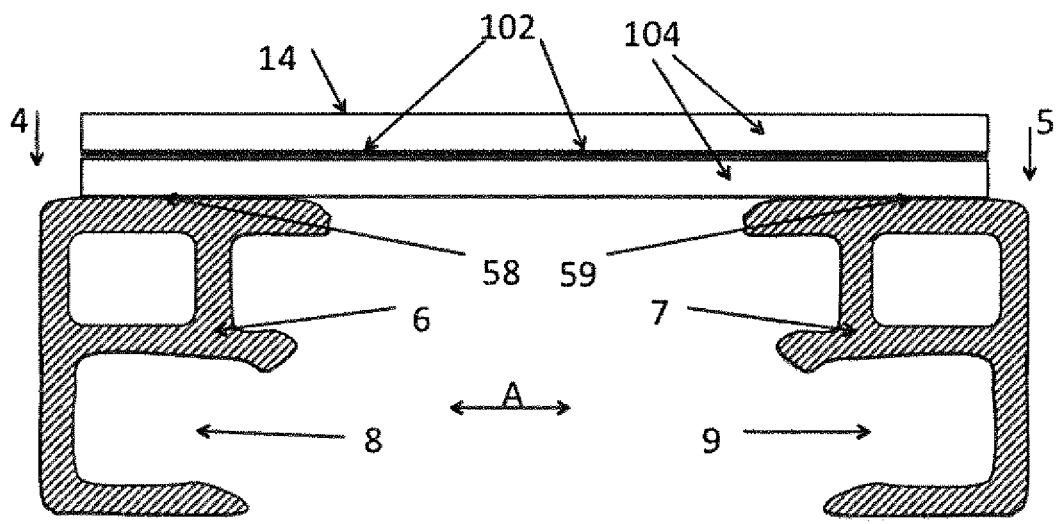
FIG. 5 represents a schematic cross section of a solar panel, double glasses, with frame according to this invention, glasses glued on frame.

Each solar panel 1 is, also, at least at the edges of two opposite sides 4-5, has frames 6-7, provided with coupling grooves 8-9, as shown in FIG. 4, and FIG. 5, which permit two adjacent identical solar panels 1 to be coupled to rail 2 with coupling tongues 10-11, as shown in FIG. 6. Glass and glasses may be glued on surfaces 68 and 9" of frame 6 and 7.

According to this invention, the coupling grooves 8-9, and coupling tongues 10-11, as represented in the FIG. 6, are provided with integrated mechanical locking parts or elements 12-13 which prevent the drifting or sliding apart of coupled solar panels 1 and rail 2 in a direction A perpendicular to the respective sides 4-5 and parallel to the solar panel surface 14 of the coupled solar panels 1; the coupling grooves 4-5 and the locking elements 12-13 are formed in one piece with the core 15 of the frame 6-7 of the solar panels 1; the coupling grooves 8-9 have such a shape that rails with coupling tongues 10-11 can be engaged into each other solely by snapping-together and/or turning after the coupling parts are partially engaged, whereby each subsequent solar panel 1 can be laterally inserted into the previous rail, and each rail can be inserted into previous solar panel; and the coupling grooves 8-9, and coupling tongues 10-11 preferably are interlocked free-of-play in all directions in a plane which is located perpendicular to the aforementioned edges.

In the case of solar panels 1 with an elongated shape, as represented in FIG. 2-3, the respective coupling parts 8-9, and 10-11 are located at the longitudinal sides 4-5.

The coupling parts 8-9 and 10-11 can be realized in various forms, although the basic forms thereof will always be formed by tongue 15 and groove 16.

Figure 7:
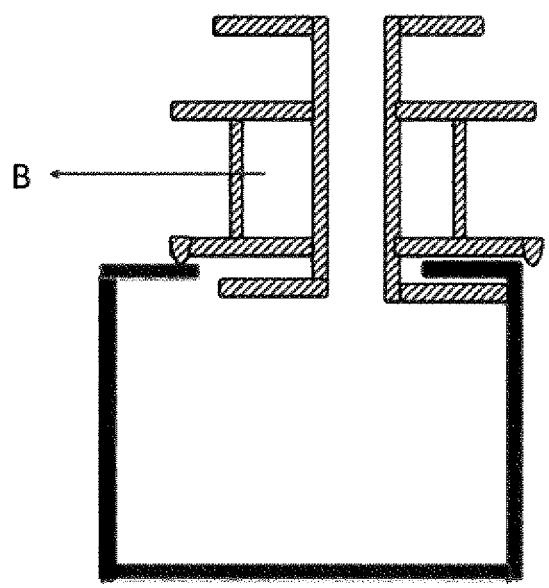
FIG. 7 represents a cross section of solar panel frames coupled with a rail by tongue and groove according to this invention, by parallel move to engage.

In the form of embodiment of FIGS. 6-7, the related solar panel 1 frame 6 is provided with coupling grooves 16, and related rail is provided with coupling tongue 15 and groove 16 which allow solar panels 1 to be engaged by means of a parallel movement in moving direction B, to ensure that solar panel 1 which is coupled to the rail 2 can not move perpendicularly in the vertical direction with respect to solar panel surface 14, without the occurrence of any snap-together effect. This particular design allows effortless engagement by parallel move, but not by turning to engage.

Figure 8:
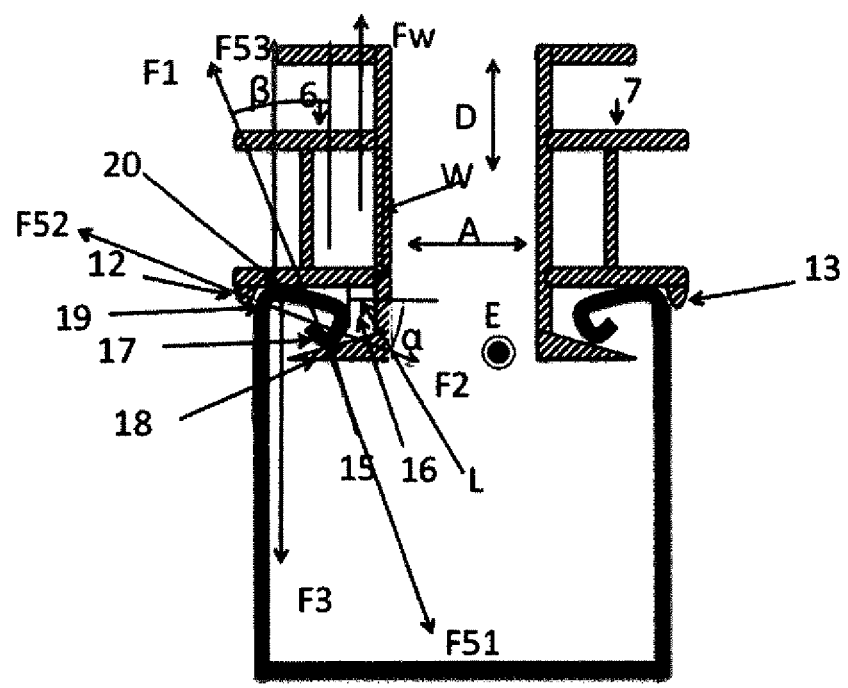
FIG. 8 represents a cross section of solar panel frames coupled with a rail by tongue and groove according to this invention.
Figure 9:
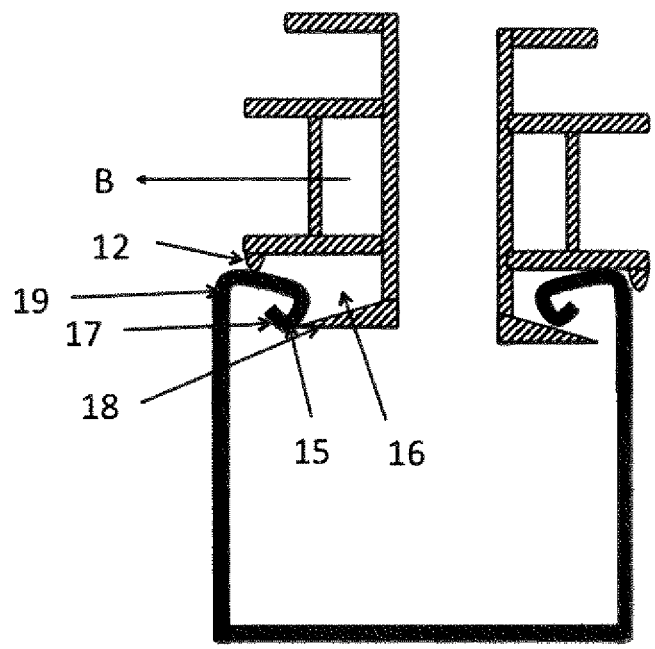
FIG. 9 represents a cross section of solar panel frames coupled with a rail by tongue and groove according to this invention, by parallel move to engage.
Figure 10:
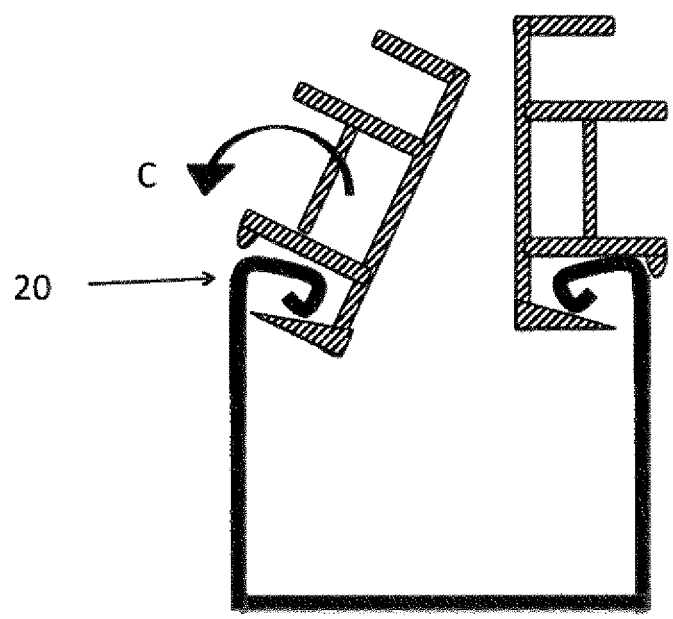
FIG. 10 represents a cross section of solar panel frames coupled with a rail by tongue and groove according to this invention, by turning to engage.

In the form of embodiment of FIGS. 8-10, the related solar panel 1 frame 6 is provided with coupling grooves 16, and related rail is provided with coupling tongue 15 and locking element 12 which allow solar panels 1 to be engaged by means of a parallel movement in moving direction B, with the occurrence of snap-together effect. The tongue 15 is formed with curve 17 and groove 16 is formed with a slope 18, to ensure that solar panel 1 which is coupled to the rail 2 can not move perpendicularly in the vertical direction D with respect to solar panel surface 14, also to ensure that solar panel 1 which is coupled to the rail 2 can not move parallel in the direction A with respect to solar panel surface 14, In order to enable solar panel 1 and rail 2 to be inserted into each other by means of a turning movement, the tongue 15 on rail 2 preferably circular and roll formed more than 180°. The bottom side of element 17 on tongue 15 sits on lower side 18 of groove 16. The slope of lower side 18 of groove 16 creates a force F1 on the bottom side 17 of tongue 15. The surface of locking element 12 creates a force F2 on upper side 19 of tongue 15. The upper side 20 of groove 16 creates a force F3 on tongue 15. Together with the two angles α of blocking element 12 and slope β of bottom side 18 of groove 16, we shall have a balance of forces including weight of solar panel W, and forces on the solar panel created by wind load Fw, as below:

$F2*Cos(\alpha)=F1*Sin(\beta)$ ensures no lateral movement of solar panel 1 relate to rail 2.½$W+F51*Cos(\beta)=F52*Sin(\alpha)+F53+$½$Fw$ Since Fw is randomly affected by wind, it requires the other forces, F51, F52 and F53 applied on solar panel 1 change accordingly. Coupled tongue and groove design with locking element serve this purpose.

Distance L between further most tip of tongue to the inner surface of groove ranges from 0 mm to 8 mm, preferably 5 mm. This distance ensures tolerance allowance caused by installer errors or mismatch from other parts, such as width tolerance of solar panels.

FIG. 9 represents a cross section of solar panel frames coupled with a rail by tongue and groove according to this invention, by parallel move to engage. The slope on bottom side 18 of groove 16 provides an entry guide to tongue 15. Certain deformation on upper side 19 and bottom side 17 of tongue 15, as well as locking element 12 and bottom side 18 of groove 16, allow the entry of tongue 15 into groove 16. Once in position, the forces F51, F52, F53 as well as solar panel weight W and wind load Fw, balance.

FIG. 10 represents a cross section of solar panel frames coupled with a rail by tongue and groove according to this invention, by turning to engage. The opening 20 of groove 16 allows tongue 15 to insert in without any deformation, making it effortless to enter. However when turning downward to engage with the locking element 12 of groove 16, certain deformation occur allow engagement and lock-in. This design in particular is easier for turning to engage.

Figure 11:
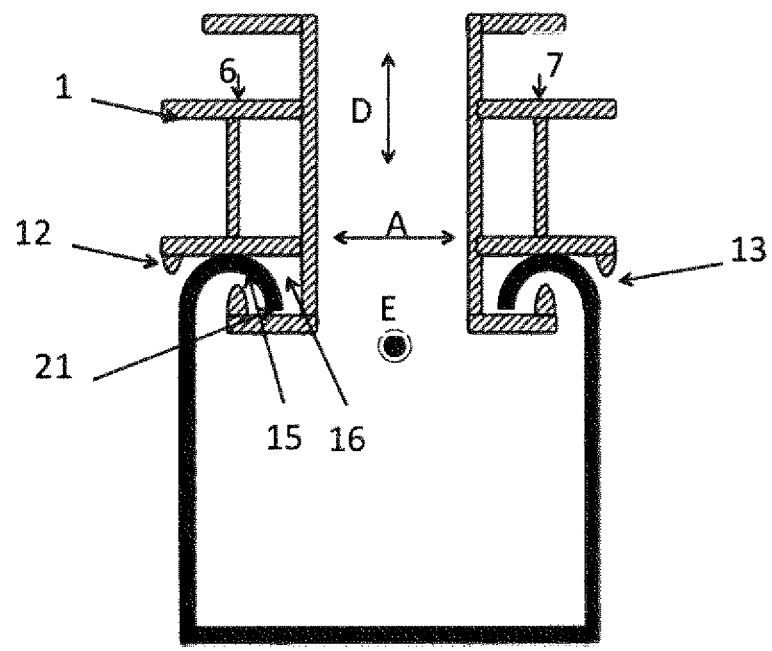
FIG. 11 represents a cross section of solar panel frames coupled with a rail by tongue and groove according to this invention.
Figure 12:
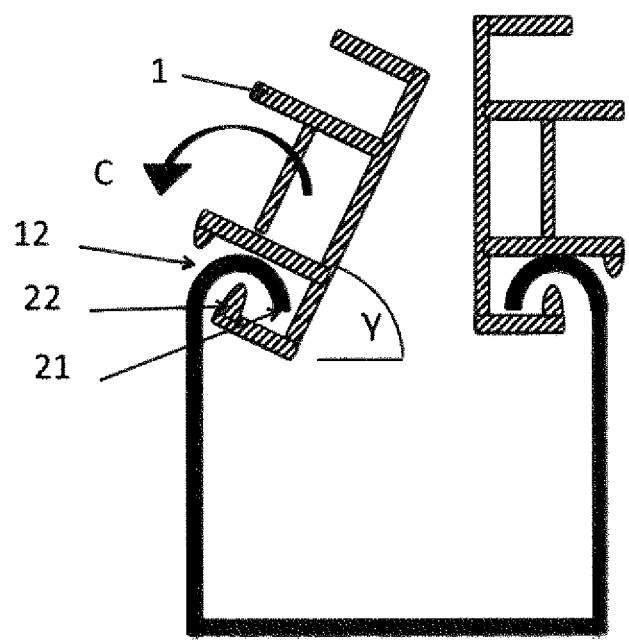
FIG. 12 represents a cross section of solar panel frames coupled with a rail by tongue and groove according to this invention, by turning to engage.

As represented in the FIGS. 11-12, the solar panels 1 according to the invention can, can turn to engage when the tip 21 of tongue 15 insert into opening 20 of groove 16. The turning angle γ can be adjusted by adjusting the tip 21 of tongue 15, locking element 12, as well as another locking element 22, added on groove 16, of the frame 2 of solar panel 1. The turning angle γ is intentionally designed relatively larger, preferably larger than 30 degrees, to ensure elimination of both lateral movement on direction A and vertical movement on direction D. On FIG. 11, the tongue 15 of rail 2 can engage with groove 16 of frame 6 by sliding along direction E. Adjustments and deviations are allowed on either the tongue 15 side of rail 2, or on the groove 16 side of frame 6. This particular design as represented in FIGS. 11-12, according to the invention, is particular for easier sliding to engage.

Figure 13:
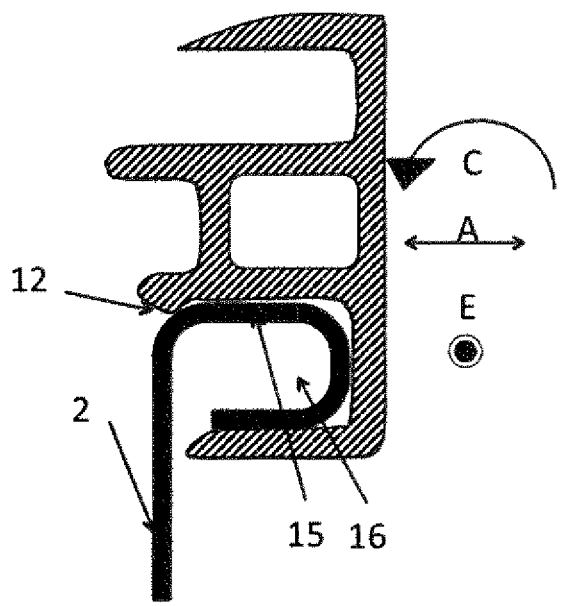
FIG. 13 represents a cross section of a coupling rail according to this invention.
Figure 14:
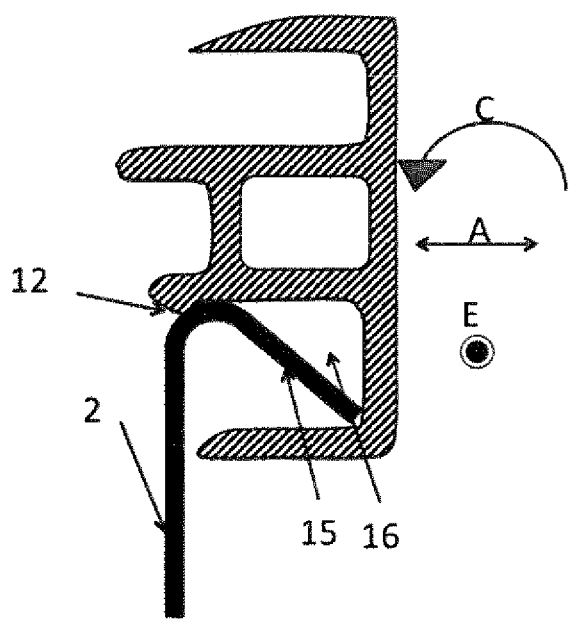
FIG. 14 represents a cross section of a coupling rail according to this invention.
Figure 15:
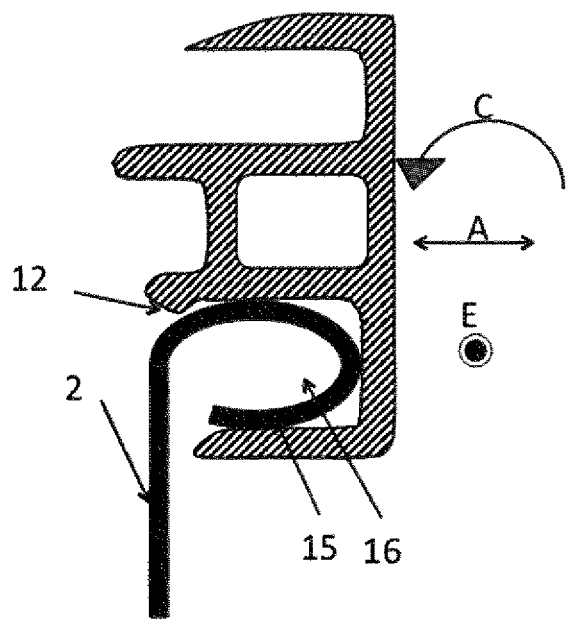
FIG. 15 represents a cross section of a coupling rail according to this invention.
Figure 16A:
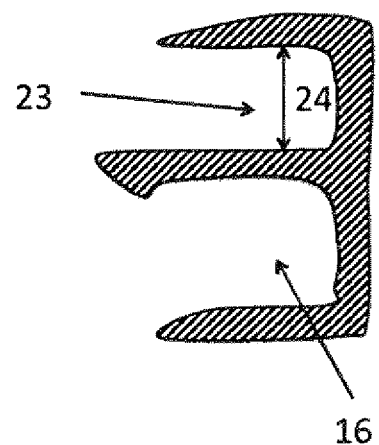
FIG. 16A represents a cross section of a solar panel frame according to this invention.
Figure 16B:
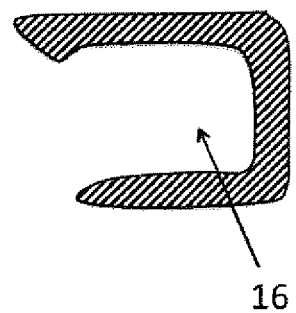
FIG. 16B represents a cross section of a solar panel frame according to this invention, for glass or glasses glued on frame.
Figure 17:
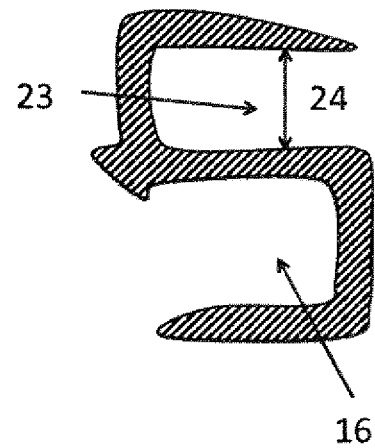
FIG. 17 represents a cross section of a solar panel frame according to this invention.

As represented in FIGS. 13-15, the tongue 15 of rail 2, according to this invention, tongue 15 can have more shapes that can be inserted into groove 16 and engage by lateral movement on direction B or 5B, by turning direction C as well as slide in direction E. The variation of the shapes of tongue 15 affects the easiness on which of the directions B or 5B, C and E. It also affects the production processes, such as roll forming of the tongue 15 from flat metal plate, such as steel plate.

As represented in FIGS. 16-19, the frames, according to this invention, may have various shapes as long as two primary features, groove 16 for engagement with tongue 15 of rail 2 and groove 23 for engagement with glass or glasses of solar panel 2, are available. The groove 23 engage with glass if the solar panel is a single glass solar panel, and engage with glasses if the solar panel is a double glass solar panel. The gap width 24 of groove 23 can be adjusted to accommodate the thickness of the glass or glasses, accordingly.

Figure 21B:
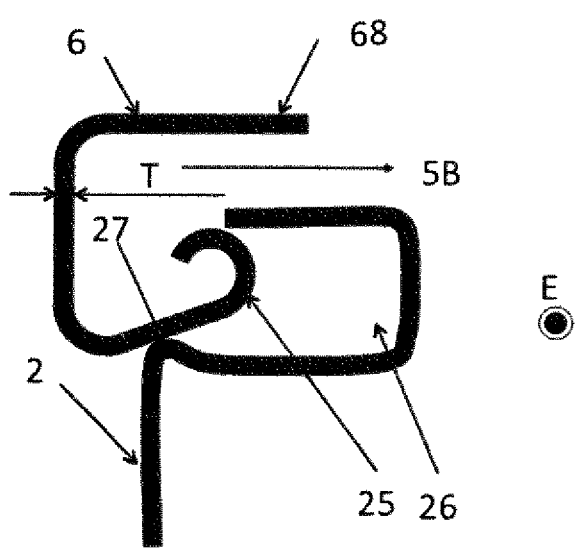
FIG. 21B represents a cross section of a solar panel frame according to this invention.
Figure 19:
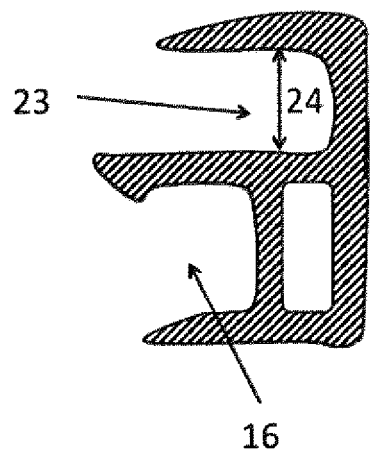
FIG. 19 represents a cross section of a solar panel frame according to this invention.
Figure 20A:
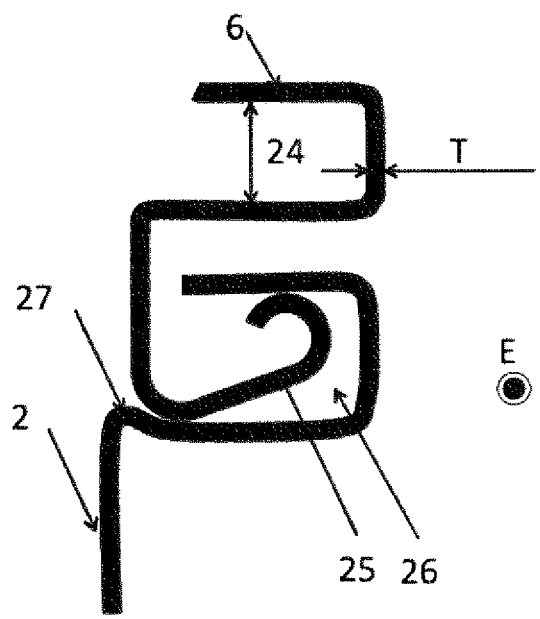
FIG. 20A represents a cross section of a solar panel frame according to this invention.
Figure 21A:
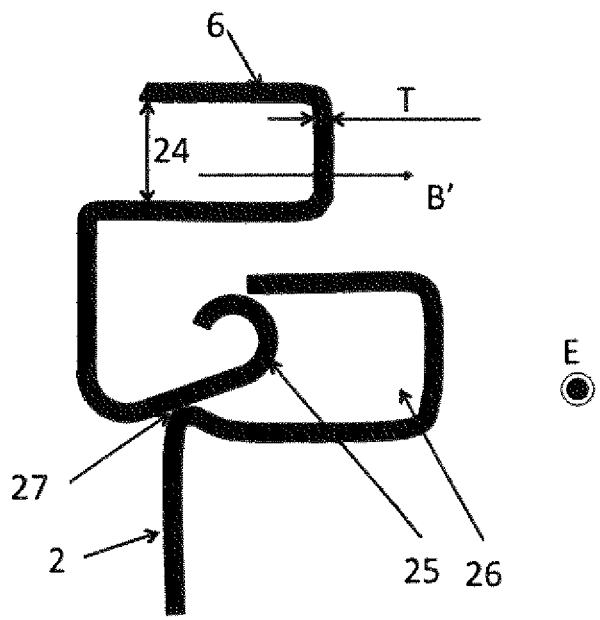
FIG. 21A represents a cross section of a solar panel frame according to this invention.
Figure 22A:
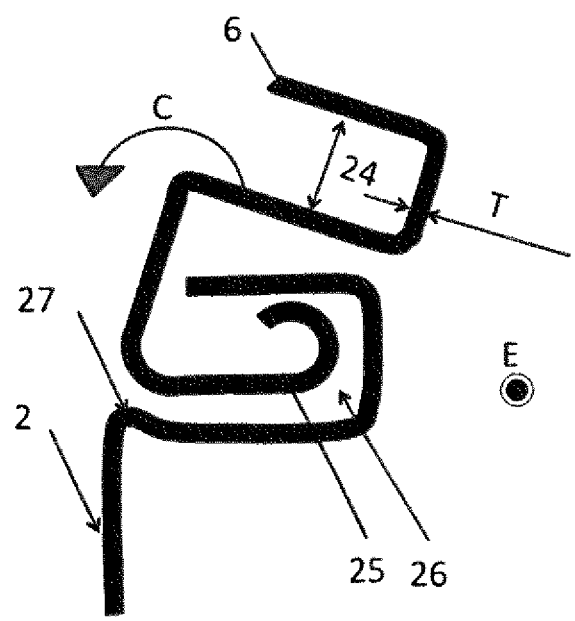
FIG. 22A represents a cross section of a solar panel frame according to this invention.

As represented in FIGS. 20-22, according to this invention, the tongue 25 is made on the frame 6, while the groove 26 is made on rail 2. The frame 6 has two primary features, namely the groove 24 to engage with glass or glasses, and the tongue 25, to engage with groove 26 on the rail 2.

With tongue 25 on the frame 6 side, the frame 6 may engage with rail 2 by moving in direction 5B, turning in direction C, or slide in direction E.

Figure 20B:
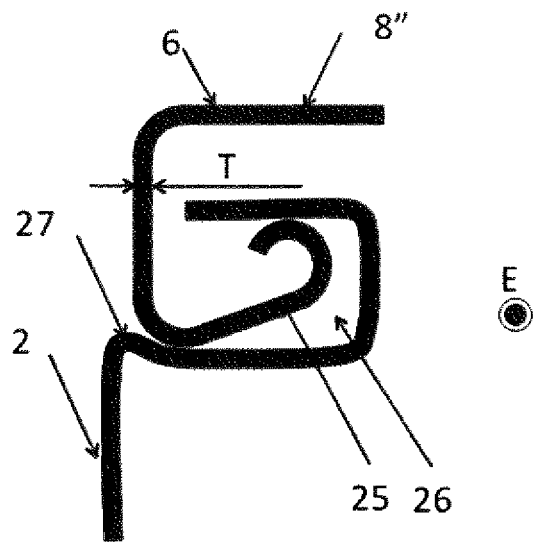
FIG. 20B represents a cross section of a solar panel frame according to this invention.
Figure 22B:
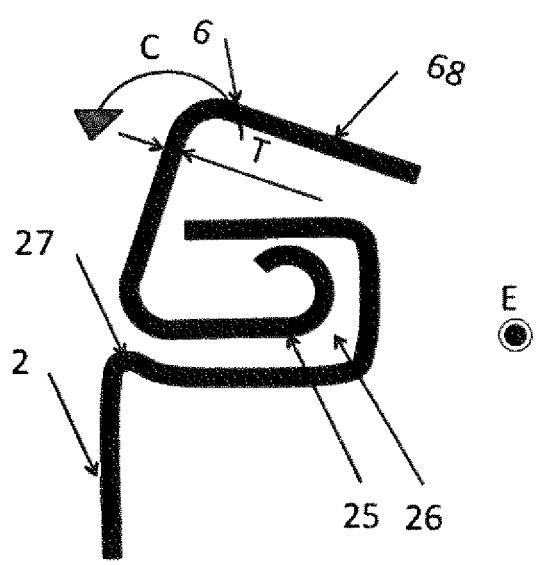
FIG. 22B represents a cross section of a solar panel frame according to this invention.
Figure 23:
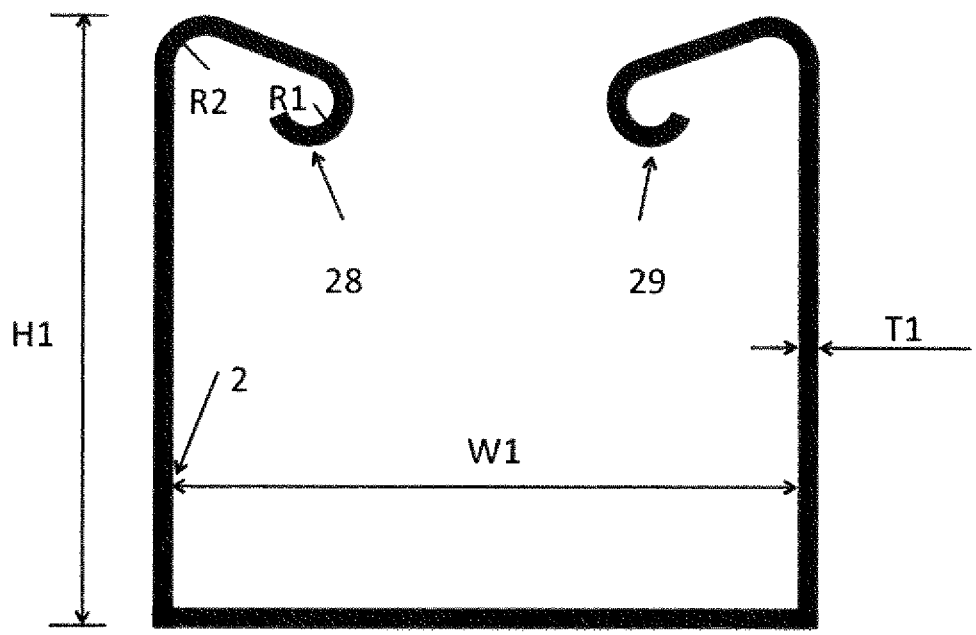
FIG. 23 represents a cross section of a solar panel coupling rail according to this invention.
Figure 24:
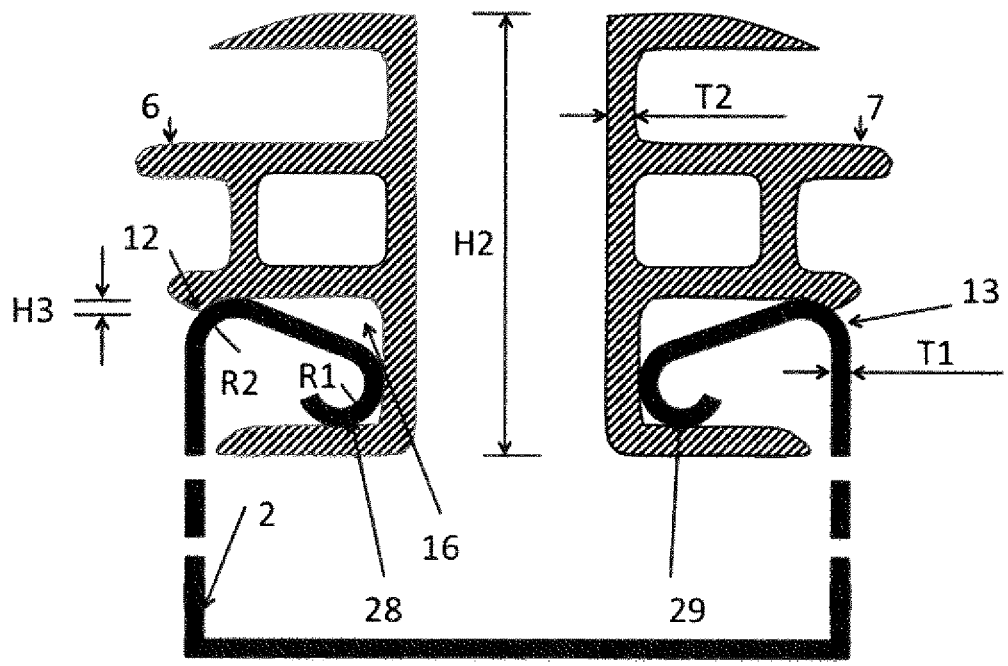
FIG. 24 represents a cross section of solar panel frames coupled with a rail according to this invention.

As represented in FIGS. 20B and 22B, according to this invention, the tongue 25 is made on the frame 6, while the groove 26 is made on rail 2. The frame 6 has two primary features, namely the surface 68 to engage with glass or glasses by glue, and the tongue 25, to engage with groove 26 on the rail 2.

With tongue 25 on the frame 6 side, the frame 6 may engage with rail 2 by moving in direction 5B, turning in direction C, or slide in direction E.

The particular thickness T may vary. The frame may be produced by extrusion of aluminum, plastic, composite or other materials. For particular thickness T may remain the same, thus the frame may be produced by roll forming of metal plate such as steel and aluminum plate.

The various forms of embodiments according to this invention, such as various designs of frames and rails, either the tongue on the rail side, or on the frame side, all have the features that, the frame engage with glass or glasses with a groove or surface gluing, and engage with the rail through tongue and groove, either the tongue on frame side or on the rail side. The engagement between frame and rail allow both frame and rail to form an integrated system. This integrated system remain balanced through the tongue and groove as well as the locking element that create the forces between frame and rail along the entire engaged or coupled length of frame and rail to not only support the frame with the solar panel weight W, but also balance the wind load Fw applied on the solar panel.

This integration along the entire coupled length between frame 6 and rail 2, is the primary embodiment of this invention. The integration by tongue and groove on the solar panel frame and the rail, with or without locking element, with tongue on the frame side or on the rail side, allows the strength of the frame 6 and rail 2 to form an integrated system to support the solar panel 1.

This integration, according to this invention, provides the opportunity to install or engage solar panel to rail with ease and less time consuming, by parallel push and pull, by turning as well as by sliding, and, more importantly, provides the opportunity to reduce the use of materials on frame and/or rail, and reduce the size of frame height H2, which determines the thickness of solar panel 1. The reduction of material use, for example on frame materials, may lead to significant reduction on frame materials usage, such as aluminum usage, as presently most solar panel frames are made of aluminum. The reduction of height of frame, may lead to reduction of the solar panel thickness, thus increase the number of solar panels in the package of same volume, and reducing the packaging and shipping cost.

As represented in FIG. 23-27 is the most preferred embodiment of this invention.

Hereby, the parts, which correspond to the previous forms of embodiments are indicated with corresponding references.

The rail 2 may be made preferably of roll forming of metal plate, in particular of steel plate, with thickness T1 preferably in the range of 0.3 mm to 3 mm, in particular 1 mm to 1.5 mm. The width W1 preferably in the range 2 cm to 20 cm, in particular 6 cm to 10 cm. The height H1 preferably in the range of 3 cm to 30 cm, in particular 6 cm to 12 cm. The radius R1 preferable in the range 1 mm to 4 mm, in particular 2.5 mm to 3.5 mm. Radius R2 may be similar to R1 but not necessary the same. The radius R1 and radius R2 are preferably larger than thickness T1 by a factor of 2 to 3. This factor of 2 to 3 is particular for roll forming production procedures.

The frame 6 may be made preferably of extrusion of metal materials, in particular of aluminum, with surface anodized. The height H2 of frame 6 preferable in the range 10 mm to 60 mm, in particular 20 mm to 25 mm for solar panel sizes comparable to existing sizes. The preferred height H2 range increases accordingly to the increase of solar panel size. The thickness T2 of frame 6 in general may vary slightly and preferably in the range of 0.5 mm to 2 mm, in particular 1 mm to 1.5 mm.

The height H3 of the locking element 12 preferably in the range 0.5 mm to 4 mm, in particular 2 mm. The smaller value of H3 allows easier engage by moving in direction B, as in FIG. 26, while the bigger value of H3 allows larger locking force F52 on the frame 6, and still can be easily engage by turning in direction C, as in FIG. 27.

When frame 6 and rail 2 engaged, the forces of F52, F53, F54, F55 as well as the weight W of solar panel and the wind load Fw from wind, balance as below:

$$F54 = F52 * \cos(\delta)$$

The balance of forces ensures no lateral movement in direction A between frame 6 and rail 2.

$$\tfrac{1}{2}W + F55 = F52 * \sin(\delta) + F53 + \tfrac{1}{2}Fw$$

The balance of forces ensures no vertical movement in direction D between frame 6 and rail 2. These forces also provide support to the weight W of solar panel, as well as balance the wind load Fw as it happens. Furthermore, these forces between frame 6 and rail 2, generate friction force Ff between frame 6 and rail 2. The friction force Ff represents a combination of friction forces generated by forces F52, F53, F54 and F55. It is an option, however, to later add a locking pin between the frame 6 and rail 2 to further ensure no unwanted sliding between frame 6 and rail 2, along the direction E. This most preferred case according to this invention may engage by inserting tongue 28 of rail 2 into groove 16 of frame 6 in the moving direction B, or in the turning direction C. This preferred case optimized the materials uses that are to use the same materials, in particular, steel for rail and aluminum for frame. This case also optimized the production procedures, in particular, produce rail by roll forming and produce frame by extrusion and anodizing. Furthermore, this preferred case according to this invention optimized installation procedures with both parallel moving to engage as well as turning to engage, creating the snap-n-lock effect, illuminating or reducing installer tolerance and error, thus increase installation efficiency and speed. This most preferred case provides coupling tongue and groove on the two opposite long edges, wherein not on the two opposite short edges. In this case, the frame on the two opposite short edges are similar on the upper section, but without coupling groove on the lower section.

The most desired benefits may be derived from this invention are the optimization of combined benefits, namely, reduction of materials usage, reduction of solar panel thickness thus of packaging and shipping cost, increase of installation speed, among other benefits.

An important characteristic herein consists in that the coupling tongue 28 and groove 16 are provided with locking elements 12, in engaged condition with the panels in a common plane, exert a tension force upon each other, as a result of which the engaged frame 6 and rail 2 are locked to each other in compression and with friction force. As represented, this is realized preferably by providing the coupling parts with an elastically yieldable or bendable materials, in this case the aluminum frame and steel rail, which, in engaged condition, is at least partially deformed and in this way creates tension forces which results in the engaged frame 6 of solar panels 1 being locked to rail 2.

Due to, on one hand, the contact forces F52-F55, and, on the other hand, the fact that these tension forces F52-F55 are created, friction forces are produced for sliding along direction E, as a result of which the solar panels 1 are locked to the rail in compression and friction. The friction forces can be configured by adjusting the dimension of coupling parts so that no locking pins or bolts are needed to prevent later drifting along rail edge. Preferably, the angle E of the guiding plane 30 of tongue 28 in range 5° to 45°, in particular 30°, and the contacting angle δ of surface 31 of locking element 12 in range 5° to 45°, in particular 30°. The optimized choices of values ε and δ relate to the elasticity of the frame 6 and rail 2 materials, the thickness T, the pushing force in direction B as well as the locking forces F52-F55 and the friction forces accordingly. Although the locking force F52-F55 preferably are delivered by the aforementioned frame 6 and rail 2, the invention does not exclude other forms of locking elements or structures whereby these forces are delivered by other compression contacts.

It is noted that the deformation of compression is relatively small, for example, several hundredths up to several tenths of a millimeter, and does not have an influence upon the glass attached to frame nor the rail that may be fixed on racking.

Due to the fact that the compression contacts may be not uniform along the solar panel edge, at the initial installation, this uneven distribution of compression may be cured afterwards due to the wind load force on solar panel as well as due to repeated heat cycles of weather, or due to tracking, such as on single axle tracking system. This leads to further stable and uniform locking engagement of frame and rail.

According to a variant of the invention, the tension force can also be supplied by means of an added pin or bolt to the integrated tongue and groove, as an option.

Figure 25:
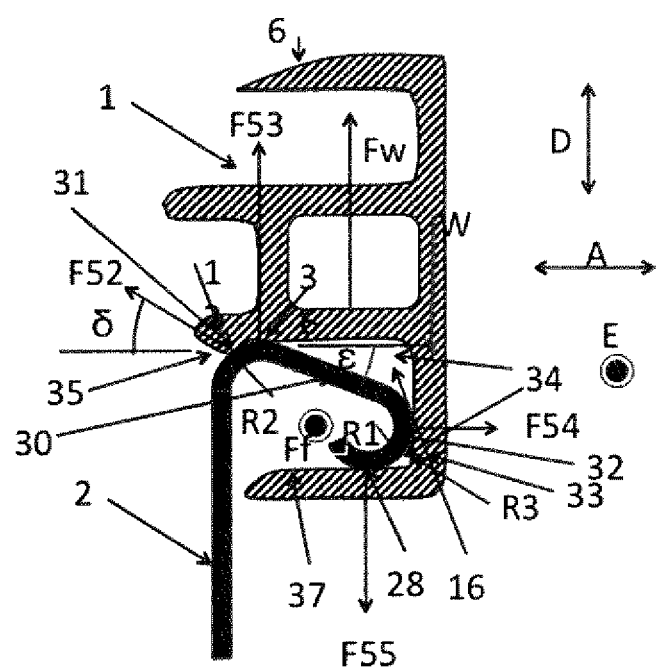
FIG. 25 represents a detail cross section of solar panel frames coupled with a rail according to this invention.
Figure 26:
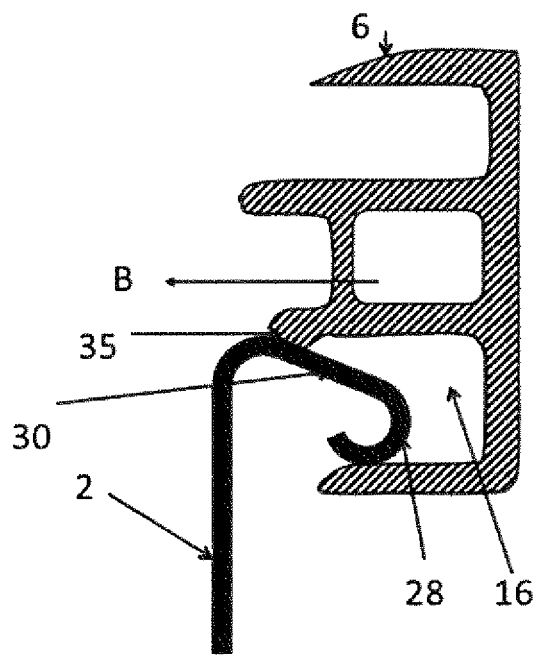
FIG. 26 represents a detail cross section of a solar panel frame couples with rail according to this invention, moving parallel to panel surface.
Figure 27:
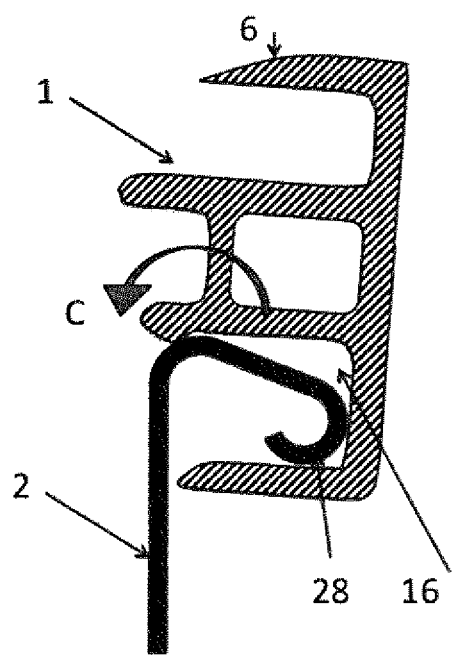
FIG. 27 represents a detail cross section of a solar panel frame couples by an angle to engage with the rail according to this invention.

A further particular characteristic of the embodiment of FIG. 25-27, consist in that the solar panels 1 with frame 6 can be selectively engaged by means of a turning movement in direction C, as represented in FIG. 27, preferably in such a manner that, during the engagement by means of the turning movement with the coupling parts partially engaged, maximum compression forces F52-F55 result in the coupling parts. The advantage of this consists in that the solar panels 1 can be engaged easily by means of a turning movement, without necessitating use of a tool therefore. It is also noted by the inventor that by turning, disengagement may be achieved without tool and that is the best case in the situation that the solar panel need to be replaced later, for instance, in later maintenance. Engagement and disengagement without tool or excessive force and deformation ensures that the solar panel intact during installation and repair processes.

According to the invention, such as in FIG. 2-5, although the locking forces on the frame at one side 4 may be also balanced by the locking forces on another side 5, it is not preferred nor recommended by inventor due to the consideration that strain forces on frame on one side 4 and another side 5, may affect the connections in between these two sides, which include the engagement of glass and frame. The engagement strength may or may not sustain the strain between these two sides 4 and 5.

Figure 18:
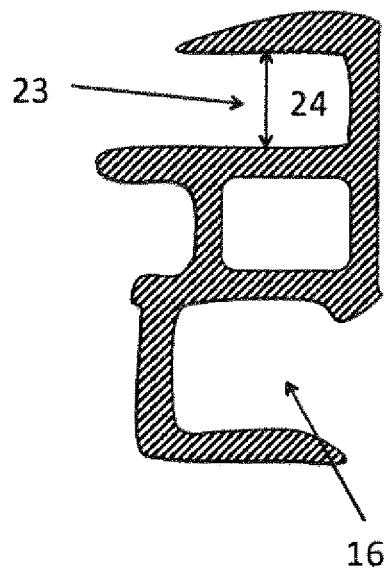
FIG. 18 represents a cross section of a solar panel frame according to this invention.

According to the invention, in the case that the four sides 4-5, 54-55 as shown in FIGS. 1A and 18, are provided with coupling frame 6-7, as in FIGS. 2-5, these coupling parts can be formed in such a manner that in one direction a firmer engagement than in the other direction is effected. In the case of elongated solar panels 1, for example, such as represented in FIGS. 1A and 1B, the locking at the small sides 54-5 may be more pronounced or less pronounced than, or equal to, at the longitudinal sides 4-5. The layout of solar panels may affect the engagement on long side or short side.

These differences in engagement can be obtained by configuring the contact surface 30 of tongue 28 and contact surface of locking element 12 of groove 16, as in FIG. 25 with different angles δ and ε.

In the preferred form of the invention, the solar panels 1 comprise coupling tongue 28, as in FIG. 25, exhibiting one of the following or the combination of two or more of the following features:

Curvature 32 is circular with radius R1, at the lower side of the tongue 28 and a curvature at the lower corner 33 of groove 16, which form a guidance when turning solar panels 1 into locking position with rail 2, with the advantage that the solar panels 1 can be engaged into each other easily during installation;

Angles δ and ε are the same or similar, with the advantages that the locking elements can easily shift over each other during their turning engagement, or during disassembly of the solar panels 1 and that the locking elements will not be damaged, for example, permanent deformation of frame and/or rail, even if the solar panels are engaged and disassembled;

Dust chambers 34, as in FIG. 25, between tongue and groove, of the engaged solar panels 1, and rail 2, with the advantage that inclusions which get between the solar panels 1 during the engagement do not exert an adverse influence upon good engagement;

A ramp surface 35, as shown in FIGS. 25-26, formed at the outer side of the locking element 12, with the advantage that the surface 30 of tongue 28 shifts smoothly over each other and that both tongue 28 and groove 16 deform uniformly;

Contact surfaces 36, as in FIG. 25, formed by the upper side of the groove 16, which, is flat and run parallel to the plane which is defined by the solar panels 1, as well as lower contact surface cooperating with each other, formed by surface 37 at lower side of groove 16, with the advantage that no mutual displacement in height between two engaged solar panels 1 is possible, even if the insertion depth of the tongue 28 into the groove 16 should vary due to various causes; in other words, no height differences may occur between the adjacent solar panels.

In the embodiment of FIGS. 23 to 27, all these characteristics are combined; it is, however, clear that, as becomes evident from FIGS. 6-22B, these features can also be provided separately or in a limited combination with one another.

As becomes evident from FIGS. 6-27, an important characteristic of the preferred embodiment of the invention consists in that the cooperative locking element, in other words, the portion providing for the snap-n-lock and engagement effect, are situated in that portion of the upper lip 12 of the groove on frame side, or situated in the portion of the lower lip of the groove on rail side, wise versa, which extends beyond the distal edge of the lip 12.

It is obvious that the coupling tongue and groove can be shaped by extrusion, and can be shaped by roll forming or even by means of milling process.

According to a particular characteristic of the invention, the frame 6 of solar panels 1 are treated with oxidation before assembled with glass, more particularly a surface treatment process, which preferably is chosen from the following series of processes: anodic oxide coating, coloration, coating, mechanical surface treatment, chemical film coating, bright anodic oxide coating (gloss treatment), enamel coating, plating and no treatment. In addition, new technologies have been developed including ion plating and sputtering. Among these aforementioned treatments, the preferred treatment is anodic oxide coating.

According to a particular characteristic of the invention, the rail 2 is treated with zinc coating, more particularly a surface treatment process, which preferably is chosen from the following series of processes: galvanizing, plating, burnishing, spray, paint, anodizing and mgni coating. Among these aforementioned treatments, the preferred treatment is galvanizing and/or megni coating. The surface treatment process may be before roll forming processes, or may be after roll forming processes.

These surface treatments also offers the advantage that, at least in the long life span of solar system in the out door environment, the aforementioned solar panel frame and rail remain protective from rust. For use of stainless steel materials, or other materials that with weather sustaining characteristics, surface treatment may be not necessary.

The present invention is in no way limited to the forms of embodiment described by way of examples and represented in the aforementioned figures, however, can such solar panel and rail be embodied in various forms and dimensions without departing from the scope of the invention.

For example, the various characteristics, which are described by means of the presented embodiments or presented examples, may be selectively combined with each other.

Furthermore, all embodiments of coupling elements described before can be applied at the longer side as well as at the shorter side of a solar panel, or only the longer side or only the shorter side has such coupling elements from this invention.

Again, as noted, the tongue may be on frame side or on rail side, with the groove on opposite side.

FIG. 1A represents a schematic diagram of solar panels assembled for fixed tiled solar system, with rails and frames coupled according to this invention FIG. 1B represents a schematic diagram of solar panels assembled for single axle tracking solar system, with rails and frames coupled according to this invention FIG. 2 represents schematic cross sections of a solar panel, single glass, with frame according to this invention, glass inserts into groove FIG. 3 represents schematic cross sections of a solar panel, double glass, with frame according to this invention, glass inserts into groove FIG. 4 represents schematic cross sections of a solar panel, single glass, with frame according to this invention, glass glued on frame FIG. 5 represents schematic cross sections of a solar panel, double glass, with frame according to this invention, glass glued on frame FIG. 6-15 represent cross sections of several rail design embodiments with tongue according to this invention FIG. 6-19 represent cross section of several frame design embodiments with groove according to this invention. FIG.

16B represents cross section of frame with glass glued on. Other frames are similar relative to the change from cross section in FIG. 16 to FIG. 16B.

FIG. 20-22 represents cross section of an embodiment of frame design with tongue and rail design with groove. It further shows the uniform thickness of frame and rail.

FIG. 23-27 represent cross section of a most preferred embodiment of frame and rail with tongue and groove, as well as locking element, according to this invention. The solar panel and rail may engage, by slide along the edge of tongue and groove, by slide perpendicular to the edge of tongue and groove (FIG. 26), and by turning to snap-in (FIG. 27).

| | |
|---|---|
| 6, 7 - frames | F52 - force on frame by tongue |
| 12, 13 - locking element | F3 - force on tongue by upper side of frame groove |
| 15 - tongue | |
| 16 - groove | F53 - force on frame by tongue |
| 17 - curve on the tongue | D - up down moving direction |
| 18 - lower side of the groove | A - Lateral movement direction perpendicular to rail |
| 19 - upper side of the tongue | |
| 20 - upper side of the groove | E - Lateral movement direction parellel to rail |
| W - weight of solar panel | |
| Fw - wind force on solar panel | α - direction of locking element surface |
| F1 - force on tongue by lower side of frame groove | |
| | β - direction of lower groove surface |
| F51 - force on frame by tongue | |
| F2 - force on tongue by locking element of frame | |

Notations for FIG. 8 References Signs

| | |
|---|---|
| 1 - solar panel | Ff - friction force on frame |
| 2 - rail | F52 - force on frame locking element by tongue |
| 6 - frame | |
| 12 - locking element | F53 - force on frame upper side of groove by tongue |
| 16 - groove | |
| 28 - tongue | F54 - force on frame side wall of groove by tongue |
| 30 - guiding plane of tongue | |
| 31 - surface of locking element | F55 - force on frame lower side of groove by tongue |
| 32 - curvature of tongue | |
| 33 - inner corner of groove | D - up down moving direction |
| 34 - dust chamber | A - Lateral movement direction perpendicular to rail |
| 35 - ramp surface | |
| 36 - contact surface | E - Lateral movement direction parallel to rail |
| 37 - surface of lower side of groove | |
| T1 - rail thickness | δ - direction of locking element surface |
| W - weight of solar panel | |
| Fw - wind force on solar panel | ε - guiding surface angle |

Notations for FIG. 23-27 references signs

I claim:

1. A solar panel assembly comprising an optional solar panel as glass and at least a pair of frames, and a rail, said solar panel assembly having:
   an upper surface that terminates at an upper side edge of each frame,
   each frame having an underside groove with an upper surface parallel to the upper surface of the frame, and a side edge, the solar panel being able to be inserted in the underside groove of each frame or glued on the upper surface of each frame;
   wherein an under side of each frame includes a rail coupling part with a rail coupling part groove or a rail coupling part tongue;
   wherein an upper side of the rail includes frame coupling parts, each frame coupling part having a frame coupling part tongue or a frame coupling part groove,
   wherein end faces of the frame coupling part tonques face each other or groove openings of the frame coupling part grooves face each other;
   wherein the rail coupling part tongue of each frame is configured to lock together with one of the frame coupling part grooves of the rail or the rail coupling part groove of each frame is configured to lock together with one of the frame coupling part tongues of the rail to couple a pair of the solar panels to said rail in a direction perpendicular to a plane of the coupled solar panels,
   wherein each said rail coupling part tongue of each of the frames and the frame coupling part grooves of the rail or each said rail coupling part groove of each of the frames and the frame coupling part tongues of the rail have respective upper and lower surfaces, the upper and lower surfaces of the rail coupling part groove of each frame forming a channel to receive the frame coupling part tongue of the rail and the upper and lower surfaces of each frame coupling part groove of the rail forming a channel to receive the rail coupling part tongue of the frame,
   wherein each rail coupling part groove of the frame has a locking element as a downwardly projecting protrusion located at an outer edge and adjacent the upper surface of the rail coupling part groove, and terminating at a distal upper side lip edge, or
   wherein each frame coupling part groove of the rail has a locking element as an upwardly projecting protrusion located at an outer edge and terminating at a distal lower side lip edge,
   each said locking element including cooperative contact surfaces arranged to be engaged when either the rail coupling part tongue and frame coupling part groove are coupled together or the frame coupling part tongue and rail coupling part groove are coupled together to prevent substantial separation of the coupled solar panel and the rail in a direction perpendicular to the side edges of the frames.

2. The solar panel assembly according to claim 1, wherein a material of each of the frames, including the locking elements, is selected from the group consisting of aluminum, steel, Bakelite, plastic or other structural materials formed into the shape by extrusion or roll forming.

3. The solar panel assembly according to claim 1, wherein an upper contact surface of each frame coupling part groove is generally parallel to a plane of the upper surface, so that minimum lateral strain is applied on each frame.

4. The solar panel assembly according to claim 1, wherein the glass can be glued to either the underside groove of the frame or the upper surface.

5. The solar panel assembly according to claim 1, wherein the frame coupling part groove is coupled to the rail coupling part.

6. The solar panel assembly according to claim 1, wherein the rail coupling part tongue is a guiding surface downwardly angled similar to an angle of the locking element of said frame coupling part groove and/or wherein said rail coupling part tongue has a distance from an outer side to an edge of an inner side less than a distance from the locking element to an inner surface of the frame coupling part groove.

7. The solar panel assembly according to claim 1, wherein said frame coupling part groove has a guiding surface on an outer side of the locking element that is downwardly angled and equal or similar to an angle of a guiding surface of said rail coupling part tongue.

8. The solar panel assembly according to claim 1, wherein the frame and rail coupling parts are dimensioned to provide a coupling free-from-play in all solar panel assembly separation and/or drifting directions in a plane extending perpendicular to the side edges when the frames are coupled together with the rail.

9. The solar panel assembly according to claim 1, wherein the rail or frame coupling parts are configured such that the frame and said rail can be selectively coupled: either by laterally sliding and snapping the cooperative rail and frame coupling parts together or by turning one relative to the other with their cooperative coupling parts partially engaged, whereby additional ones of the solar panel can be sequentially coupled to the previously coupled rail, and additional ones of said rail can be sequentially coupled to the previously coupled solar panel, by laterally sliding each additional solar panel into a previously coupled rail, and laterally sliding each additional rail into a previously coupled solar panel, or by relative turning motions of an additional one relative to the other; or by sliding along the solar panel edge to engage the frame and rail coupling parts together, whereby additional ones of said solar panel can be sequentially coupled to previously coupled rails, and additional ones of said rail can be sequentially coupled to previously coupled solar panels.

10. The solar panel assembly according to claim 1, wherein a distal end of a lower lip of said rail coupling part tongue has a sloped ramp surface, said sloped ramp surface configured such that when a frame supporting part groove is moved laterally towards a rail support part tongue approximately in a plane including the solar panel and rail to cause engagement of cooperative frame and rail coupling parts, a protrusion of said frame coupling part groove is guided over the distal end of the lower lip by said ramp surface as the frame coupling part groove traverses said distal end of the lower lip.

11. The solar panel assembly according to claim 1, wherein said rail coupling part tongue and frame coupling part groove are dimensioned and configured such that one of said solar panel and said rail can be coupled together from a position where the frame coupling parts of the solar panel assembly and the rail are partially engaged by turning one relative to the other and vice versa, and with said turning movement centered at a lower corner of the frame coupling part groove, and such that, during the turning movement, the rail coupling part tongue of said frame can freely slide into the frame coupling part groove.

12. The solar panel assembly according to claim 1, wherein each of the locking elements have rounded edges.

13. The solar panel assembly according to claim 1, wherein each of the frame coupling parts are configured so that the solar panel can be coupled to the rail with the frame and rail coupling parts engaged and locked against lateral and vertical separation without glue or bolt, whereby the solar panel and the rail can be freely disassembled and recoupled.

14. The solar panel assembly to claim 1, further comprising the glass, wherein the glass of the solar panel includes one of a thin film CdTe solar cell and a thin film GaAs solar cell.

15. The solar panel assembly according to claim 14, wherein each of the frames are attached to an under surface of the glass.

16. A solar panel assembly comprising an optional solar panel as glass and at least a pair of frames, and a rail, said solar panel assembly having:

an upper surface that terminates at an upper side edge of each frame, each frame having an underside groove with an upper surface parallel to the upper surface of the frame, and a side edge, the solar panel being able to be inserted in the underside groove of each frame or glued on the upper surface of each frame;

wherein an under side of each frame includes a rail coupling part with a rail coupling part groove or a rail coupling part tongue;

wherein an upper side of the rail includes frame coupling parts, each frame coupling part having a frame coupling part tongue or a frame coupling part groove;

wherein the rail coupling part tongue of each frame is configured to lock together with one of the frame coupling part grooves of the rail or the rail coupling part groove of each frame is configured to lock together with one of the frame coupling part tongues of the rail to couple a pair of the solar panels to said rail in a direction perpendicular to a plane of the coupled solar panels, wherein each said rail coupling part tonque of each of the frames and the frame coupling part grooves of the rail or each said rail coupling part groove of each of the frames and the frame coupling part tongues of the rail have respective upper and lower surfaces, the upper and lower surfaces of the rail coupling part groove of each frame forming a channel to receive the frame coupling part tongue of the rail and the upper and lower surfaces of each frame coupling part groove of the rail forming a channel to receive the rail coupling part tongue of the frame, wherein each rail coupling part groove of the frame has a locking element as a downwardly projecting protrusion located at an outer edge and adjacent the upper surface of the rail coupling part groove, and terminating at a distal upper side lip edge, or wherein each frame coupling part groove of the rail has a locking element as an upwardly projecting protrusion located at an outer edge and terminating at a distal lower side lip edge, each said locking element including cooperative contact surfaces arranged to be engaged when either the rail coupling part tongue and frame coupling part groove are coupled together or the frame coupling part tongue and rail coupling part groove are coupled together to prevent substantial separation of the coupled solar panel and the rail in a direction perpendicular to the side edges of the frames, wherein each rail coupling part or frame coupling part tongue has a locking surface, each locking surface defined by the upper side of said rail coupling part or frame coupling part tongue extending downwardly from the upper side of the rail coupling part or frame coupling part tongue at an inclination that extends inwardly and downwardly from a proximally outer location to a distally inner location.

17. A solar panel assembly comprising an optional solar panel as glass and at least a pair of frames, and a rail, said solar panel assembly having:

an upper surface that terminates at an upper side edge of each frame, each frame having an underside groove with an upper surface parallel to the upper surface of the frame, and a side edge, the solar panel being able to be inserted in the underside groove of each frame or glued on the upper surface of each frame;

wherein an under side of each frame includes a rail coupling part with a rail coupling part groove or a rail coupling part tongue;

wherein an upper side of the rail includes frame coupling parts, each frame coupling part having a frame coupling part tongue or a frame coupling part groove;

wherein the rail coupling part tongue of each frame is configured to lock together with one of the frame coupling part grooves of the rail or the rail coupling part groove of each frame is configured to lock together with one of the frame coupling part tongues of the rail to couple a pair of the solar panels to said rail in a direction perpendicular to a plane of the coupled solar panels, wherein each said rail coupling part tongue of each of the frames and the frame coupling part grooves of the rail or each said rail coupling part groove of each of the frames and the frame coupling part tongues of the rail have respective upper and lower surfaces, the upper and lower surfaces of the rail coupling part groove of each frame forming a channel to receive the frame coupling part tongue of the rail and the upper and lower surfaces of each frame coupling part groove of the rail forming a channel to receive the rail coupling part tongue of the frame, wherein each rail coupling part groove of the frame has a locking element as a downwardly projecting protrusion located at an outer edge and adjacent the upper surface of the rail coupling part groove, and terminating at a distal upper side lip edge, or wherein each frame coupling part groove of the rail has a locking element as an upwardly projecting protrusion located at an outer edge and terminating at a distal lower side lip edge, each said locking element including cooperative contact surfaces arranged to be engaged when either the rail coupling part tongue and frame coupling part groove are coupled together or the frame coupling part tongue and rail coupling part groove are coupled together to prevent substantial separation of the coupled solar panel and the rail in a direction perpendicular to the side edges of the frames, wherein the rail coupling part tongue and frame coupling part groove each have a shape such that, in a coupled condition of the rail coupling part tongue and the frame coupling part groove, there are chambers defined by a space between a lower surface of a downwardly guiding surface of said rail coupling part tongue and an adjacent upper surface of the frame coupling part groove, as well as by a space between a curvature of said rail coupling part tongue of a larger radius and a lower inside corner of said frame coupling part groove with a smaller radius, said chambers being located on a tip side of said rail coupling part tongue and an inner side of the frame supporting part groove.

18. A solar panel assembly comprising an optional solar panel as glass and at least a pair of frames, and a rail, said solar panel assembly having:

an upper surface that terminates at an upper side edge of each frame, each frame having an underside groove with an upper surface parallel to the upper surface of the frame, and a side edge, the solar panel being able to be inserted in the underside groove of each frame or glued on the upper surface of each frame;

wherein an under side of each frame includes a rail coupling part with a rail coupling part groove or a rail coupling part tongue;

wherein an upper side of the rail includes frame coupling parts, each frame coupling part having a frame coupling part tongue or a frame coupling part groove;

wherein the rail coupling part tongue of each frame is configured to lock together with one of the frame coupling part grooves of the rail or the rail coupling part groove of each frame is configured to lock together with one of the frame coupling part tongues of the rail to couple a pair of the solar panels to said rail in a direction perpendicular to a plane of the coupled solar panels, wherein each said rail coupling part tongue of each of the frames and the frame coupling part grooves of the rail or each said rail coupling part groove of each of the frames and the frame coupling part tongues of the rail have respective upper and lower surfaces, the upper and lower surfaces of the rail coupling part groove of each frame forming a channel to receive the frame coupling part tongue of the rail and the upper and lower surfaces of each frame coupling part groove of the rail forming a channel to receive the rail coupling part tongue of the frame, wherein each rail coupling part groove of the frame has a locking element as a downwardly projecting protrusion located at an outer edge and adjacent the upper surface of the rail coupling part groove, and terminating at a distal upper side lip edge, or wherein each frame coupling part groove of the rail has a locking element as an upwardly projecting protrusion located at an outer edge and terminating at a distal lower side lip edge, each said locking element including cooperative contact surfaces arranged to be engaged when either the rail coupling part tongue and frame coupling part groove are coupled together or the frame coupling part tongue and rail coupling part groove are coupled together to prevent substantial separation of the coupled solar panel and the rail in a direction perpendicular to the side edges of the frames, The solar panel assembly according to claim 1, wherein said rail coupling part tongue and frame coupling part groove are configured and dimensioned such that when the frames of two sides of adjacent solar panels are coupled in one rail with opposite upper side edges of the frames on the same plane as side surfaces of the glass, said frames exert minimum tension force upon each other tending to isolate movement and/or vibration upon each other, wherein at least one of the rail or frame coupling parts comprises an elastically yieldable portion which, when said solar panel and said rail are coupled, is at least partially deformed within an elastic yield range thereof to produce said tension force.

19. A solar panel assembly comprising an optional solar panel as glass and at least a pair of frames, and a rail, said solar panel assembly having:

an upper surface that terminates at an upper side edge of each frame, each frame having an underside groove with an upper surface parallel to the upper surface of the frame, and a side edge, the solar panel being able to be inserted in the underside groove of each frame or glued on the upper surface of each frame;

wherein an under side of each frame includes a rail coupling part with a rail coupling part groove or a rail coupling part tongue;

wherein an upper side of the rail includes frame coupling parts, each frame coupling part having a frame coupling part tongue or a frame coupling part groove;

wherein the rail coupling part tongue of each frame is configured to lock together with one of the frame coupling part grooves of the rail or the rail coupling part groove of each frame is configured to lock together with one of the frame coupling part tongues of the rail to couple a pair of the solar panels to said rail in a direction perpendicular to a plane of the coupled solar panels, wherein each said rail coupling part tongue of each of the frames and the frame coupling part grooves of the rail or each said rail coupling part groove of each of the frames and the frame coupling part tongues of the rail have respective upper and lower surfaces, the upper and lower surfaces of the rail coupling part groove of each frame forming a channel to receive the frame coupling part tongue of the rail and the upper and lower surfaces of each frame coupling part groove of the rail forming a channel to receive the rail coupling part tongue of the frame, wherein each rail coupling part groove of the frame has a locking element as a downwardly projecting protrusion located at an outer edge and adjacent the upper surface of the rail coupling part groove, and terminating at a distal upper side lip edge, or wherein each frame coupling part groove of the rail has a locking element as an upwardly projecting protrusion located at an outer edge and terminating at a distal lower side lip edge, each said locking element including cooperative contact surfaces arranged to be engaged when either the rail coupling part tongue and frame coupling part groove are coupled together or the frame coupling part tongue and rail coupling part groove are coupled together to prevent substantial separation of the coupled solar panel and the rail in a direction perpendicular to the side edges of the frames, wherein an upper surface of the frame coupling part groove of the rail is flat and is configured to define a guidance surface for guiding coupling parts of the rail coupling part tongue into engagement with the frame coupling part of the rail when one of said solar panels is rotated relative to said rail with the frame and rail coupling parts partially engaged.

* * * * *